(12) United States Patent
Morishita

(10) Patent No.: US 9,904,843 B2
(45) Date of Patent: Feb. 27, 2018

(54) INFORMATION PROCESSING DEVICE, INFORMATION PROCESSING METHOD, AND PROGRAM

(71) Applicant: NEC Corporation, Tokyo (JP)

(72) Inventor: Yusuke Morishita, Tokyo (JP)

(73) Assignee: NEC CORPORATION, Tokyo (JP)

( * ) Notice: Subject to any disclaimer, the term of this patent is extended or adjusted under 35 U.S.C. 154(b) by 0 days.

(21) Appl. No.: 14/389,164

(22) PCT Filed: Dec. 28, 2012

(86) PCT No.: PCT/JP2012/084132
§ 371 (c)(1),
(2) Date: Sep. 29, 2014

(87) PCT Pub. No.: WO2013/145496
PCT Pub. Date: Oct. 3, 2013

(65) Prior Publication Data
US 2015/0086121 A1    Mar. 26, 2015

(30) Foreign Application Priority Data

Mar. 27, 2012 (JP) .................................. 2012-072098

(51) Int. Cl.
*G06K 9/00* (2006.01)
*G06K 9/62* (2006.01)
*G06T 7/73* (2017.01)

(52) U.S. Cl.
CPC ....... *G06K 9/00248* (2013.01); *G06K 9/6202* (2013.01); *G06K 9/6277* (2013.01);
(Continued)

(58) Field of Classification Search
None
See application file for complete search history.

(56) References Cited

U.S. PATENT DOCUMENTS 8,885,923 B2 * 11/2014 Ishiyama ............... G06T 7/0042
345/419
2004/0022432 A1 * 2/2004 Hayata ............... G06K 9/00221
382/159
(Continued)

FOREIGN PATENT DOCUMENTS

JP      06-348851        12/1994
JP      2003308533 A     10/2003
(Continued)

OTHER PUBLICATIONS

Cristinacce, David, and Timothy F. Cootes. "Facial feature detection using AdaBoost with shape constraints." BMVC. 2003.*
(Continued)

*Primary Examiner* — Kim Vu
*Assistant Examiner* — Nathan Bloom
(74) *Attorney, Agent, or Firm* — Young & Thompson

(57) ABSTRACT

An information processing device and method can detect facial feature point positions with high accuracy. The information processing device includes: a facial image input unit receiving a facial image; a facial feature point reliability generation unit generating, based on a plurality of classifiers for computing the suitability of feature points of a face, a reliability image indicating the suitability for each feature point from the facial image; a facial feature point candidate position computation unit obtaining a candidate position of the feature point in the facial image based on the reliability image; and a facial shape model conformity computation unit determining a feature point that satisfies conditions based on a position corresponding to each of the feature points of one facial shape model selected from a plurality of statistically generated facial shape models and the candidate position of the feature point, and calculating a conformity to the facial shape model.

6 Claims, 6 Drawing Sheets

(52) U.S. Cl.
CPC ...... *G06T 7/73* (2017.01); *G06T 2207/20164* (2013.01); *G06T 2207/30201* (2013.01)

(56) References Cited

U.S. PATENT DOCUMENTS

| | | | | |
|---|---|---|---|---|
| 2004/0175039 | A1* | 9/2004 | Miller | G06K 9/00208 382/181 |
| 2006/0251338 | A1* | 11/2006 | Gokturk | G06F 17/30253 382/305 |
| 2008/0193020 | A1* | 8/2008 | Sibiryakov | G06K 9/00248 382/209 |
| 2011/0091113 | A1* | 4/2011 | Ito | G06K 9/00248 382/197 |
| 2012/0308124 | A1* | 12/2012 | Belhumeur | G06K 9/00281 382/159 |
| 2013/0022277 | A1* | 1/2013 | Morishita | G06T 7/73 382/201 |
| 2015/0023606 | A1* | 1/2015 | Morishita | G06K 9/00261 382/219 |

FOREIGN PATENT DOCUMENTS

| | | |
|---|---|---|
| JP | 2005-208850 | 8/2005 |
| JP | 2009157767 A | 7/2009 |
| JP | 2010-073138 | 4/2010 |
| JP | 2010-271955 | 12/2010 |
| WO | WO 2011/148596 | 12/2011 |

OTHER PUBLICATIONS

Liao, Chia-Te, Chih-Hsueh Duan, and Shang-Hong Lai. "Accurate facial feature localization on expressional face images based on a graphical model approach." Advances in Multimedia Information Processing—PCM 2010. Springer Berlin Heidelberg, 2010. 672-681.*

Ishiyama et al, WO2011086889A, Jul. 21, 2011, WIPO.*

International Search Report, PCT/JP2012/084132, dated Mar. 19, 2013.

Japanese Office Action dated Feb. 3, 2017; Application No. 2014-507341.

* cited by examiner

INFORMATION PROCESSING DEVICE, INFORMATION PROCESSING METHOD, AND PROGRAM

BACKGROUND

Some embodiments of the present invention relate to an information processing device, an information processing method, and a program.

Techniques for detecting the positions of feature points (hereinafter also referred to as "facial feature points") of facial organs such as the eyes and the nose from an image in which a face is imaged (hereinafter also referred to as a "facial image") and outputting the detected facial feature point positions are important for performing face direction estimation, face authentication, facial expression recognition, and the like with high accuracy. Various methods of detecting the facial feature point positions have therefore been proposed.

For example, Patent Document 1 discloses a method of reducing a search region of facial feature points using a joint probability density function of the positions of facial feature points to improve detection accuracy as a method of detecting facial feature points and outputting facial feature point positions. In this method, first, a probability density function of the positions of facial feature points is applied to a facial region to calculate a plurality of facial feature point candidates for each facial feature point based on an evaluation value indicating the suitability of each facial feature point.

Patent Document 1: Patent Publication JP-A-2010-073138

SUMMARY

However, in the method disclosed in Patent Document 1, when a less-reliable facial feature point candidate is input for one or a plurality of facial feature points (that is, when a candidate indicating a true facial feature point position is not extracted), a prior probability calculated based on the facial feature point candidate and a search region calculated according to the prior probability are not set properly. Thus, there is a problem in that it is likely that the facial feature point detection fails.

Some embodiments of the present invention have been made in view of the above-described problem, and an object of the present invention is to provide an information processing device and an information processing method capable of detecting facial feature point positions with high accuracy even when less-reliable information is input for one or a plurality of facial feature points.

An information processing device according to the present invention includes: input means for receiving a facial image; reliability calculation means for generating, based on a plurality of classifiers for computing the suitability of feature points of a face, a reliability image indicating the suitability for each feature point from the facial image; candidate position calculation means for obtaining a candidate position of the feature point in the facial image based on the reliability image; and conformity calculation means for determining a feature point that satisfies conditions based on a position corresponding to each of the feature points of one facial shape model selected from a plurality of statistically generated facial shape models and the candidate position of the feature point calculated by the candidate position calculation means, and for calculating a conformity to the facial shape model.

An information processing method according to the present invention includes the steps of: receiving a facial image; generating, based on a plurality of classifiers for computing the suitability of feature points of a face, a reliability image indicating the suitability for each feature point from the facial image; obtaining a candidate position of the feature point in the facial image based on the reliability image; and determining a feature point that satisfies conditions based on a position corresponding to each of the feature points of one facial shape model selected from a plurality of statistically generated facial shape models and the candidate position of the feature point, and calculating a conformity to the facial shape model.

A program according to the present invention causes an information processing device to execute the steps of: receiving a facial image; generating, based on a plurality of classifiers for computing the suitability of feature points of a face, a reliability image indicating the suitability for each feature point from the facial image; obtaining a candidate position of the feature point in the facial image based on the reliability image; and determining a feature point that satisfies conditions based on a position corresponding to each of the feature points of one facial shape model selected from a plurality of statistically generated facial shape models and the candidate position of the feature point, and calculating a conformity to the facial shape model.

In the present invention, "units," "means," and "devices" do not mean physical means only but the functions of the "units," "means," and "devices" may be realized by software. Moreover, the function of one "unit," "means," or "device" may be realized by two or more physical means or devices, and the functions of two or more "units," "means," and "devices" may be realized by one physical means or device.

According to the present invention, it is possible to provide an information processing device and an information processing method capable of detecting facial feature point positions with high accuracy even when less-reliable information is input for one or a plurality of facial feature points.

DETAILED DESCRIPTION

Hereinafter, an embodiment of the present invention will be described. In the following description and the drawings referenced, the same or similar configuration will be denoted by the same or similar reference symbols.

(1. Functional Configuration)

Figure 1:
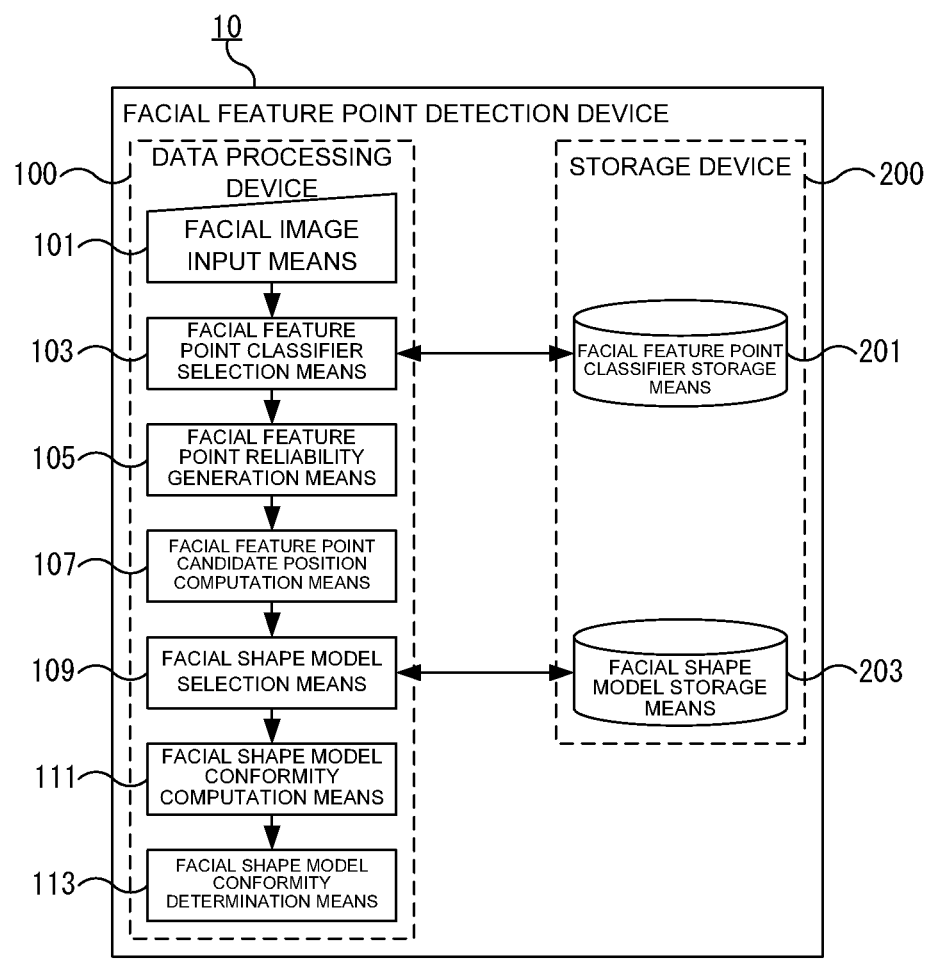
FIG. 1 is a functional block diagram illustrating a schematic configuration of a facial feature point detection device according to an embodiment.

Referring to FIG. 1, a functional configuration of a facial feature point detection device 10 which is an information processing device according to the present embodiment will be described. FIG. 1 is a functional block diagram illustrating the functional configuration of the facial feature point detection device 10.

The facial feature point detection device 10 roughly includes a data processing device 100 and a storage device 200. Here, the data processing device 100 can be realized by a central processing unit (CPU) which is an arithmetic device that executes processes according to the control of a program, for example. Moreover, the storage device 200 can be realized by a semiconductor memory or a hard disk drive (HDD), for example.

The data processing device 100 includes facial image input means 101, facial feature point classifier selection means 103, facial feature point reliability generation means 105, facial feature point candidate position computation means 107, facial shape model selection means 109, facial shape model conformity computation means 111, and facial shape model conformity determination means 113.

The facial image input means 101 receives an image (hereinafter also referred to as a "facial image") in which a face is imaged. The facial image input means 101 receives an image captured by a digital camera, for example, via a storage medium or cable or radio communication. Alternatively, the facial image input means 101 may receives the facial image that is captured by a camera module (not illustrated) included in the facial feature point detection device 10.

The facial feature point classifier selection means 103 selects one facial feature point classifier from facial feature point classifier storage means 201 that stores information on a plurality of facial feature point classifiers used for calculating the suitability of each of facial feature points which are the feature points of respective facial organs such as the eyes, the nose, and the mouth.

The facial feature point reliability generation means 105 generates a reliability image indicating the suitability of the facial feature point of the eyes, the nose, or the like from the facial image input by the facial image input means 101 using the facial feature point classifier selected by the facial feature point classifier selection means 103.

The facial feature point candidate position computation means 107 calculates the position (candidate position) of the candidate for the facial feature point based on the reliability image generated by the facial feature point reliability generation means 105. Hereinafter, the candidate position of the facial feature point calculated by the facial feature point candidate position computation means 107 will be also referred to as a facial feature point candidate.

The facial shape model selection means 109 selects one facial shape model from the information on a plurality of statistical facial shape models stored in a facial shape model storage means 203.

The facial shape model conformity computation means 111 determines, among the facial feature point candidates calculated by the facial feature point candidate position computation means 107, a facial feature point of which the difference from the statistical facial shape model is small, that is, a facial feature point of which the position shows that the facial feature point is probable as a facial shape, and computes (calculates) the conformity between the determined facial feature point candidate and the facial shape model.

The facial shape model conformity determination means 113 determines whether the facial shape model conformity computed by the facial shape model conformity computation means 111 is smaller than a predetermined threshold. When the conformity is smaller than the threshold, the processes by the facial feature point classifier selection means 103 to the facial shape model conformity computation means 111 are executed again to compute the facial shape model conformity based on another facial feature point classifier and another facial shape model.

The storage device 200 includes the facial feature point classifier storage means 201 and the facial shape model storage means 203. As described above, the facial feature point classifier storage means 201 stores information on the facial feature point classifier used for calculating the suitability of each facial feature point, and the facial shape model storage means 203 stores information on a plurality of statistical facial shape models.

(2. Process Flow)

Figure 2:
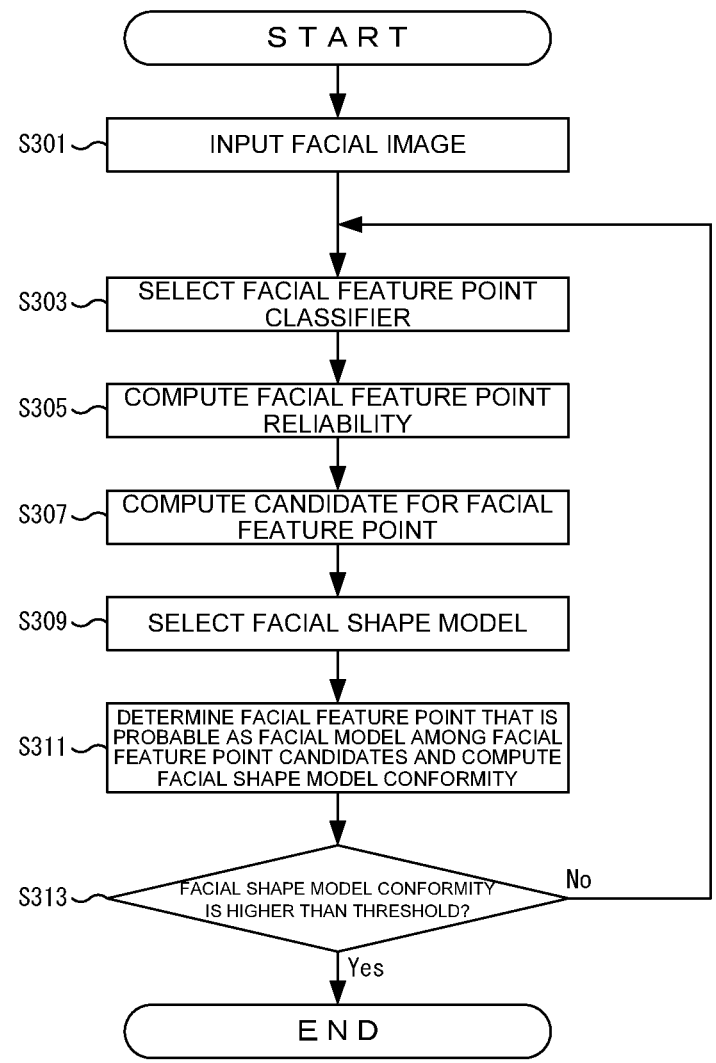
FIG. 2 is a flowchart illustrating the flow of a process performed by the facial feature point detection device illustrated in FIG. 1.

Next, the flow of the process performed by the facial feature point detection device 10 will be described with reference to FIG. 2. FIG. 2 is a flowchart illustrating the flow of the process performed by the facial feature point detection device 10 according to the present embodiment.

The process steps described later may be executed in an optional order or in parallel unless a conflict occurs in the processing contents, and another step may be added between the respective processing steps. Further, a step described as one step for the sake of convenience may be executed in a plurality of substeps, and steps described as substeps for the sake of convenience may be executed as one step.

First, the facial image input means 101 receives a facial image (S301). Subsequently, the facial feature point classifier selection means 103 selects one facial feature point classifier among a plurality of facial feature point classifiers for computing the suitability of each of facial feature points which are the feature points of respective facial organs, stored in the facial feature point classifier storage means 201 (S303). Subsequently, the facial feature point reliability generation means 105 generates a reliability image indicating the suitability of the facial feature point of the eyes, the nose, or the like, using the facial feature point classifier selected by the facial feature point classifier selection means 103 from the facial image input by the facial image input means 101 (S305). The facial feature point candidate position computation means 107 computes a candidate position of the facial feature point based on the reliability image (S307).

After that, the facial shape model selection means 109 selects one facial shape model among a plurality of facial shape models stored in the facial shape model storage means 203 (S309). The facial shape model conformity computation means 111 determines, among the facial feature point candidates calculated by the facial feature point candidate position computation means 107, a facial feature point of which the difference from the statistical facial shape model is small, that is, a facial feature point of which the position shows that the facial feature point is probable as a facial shape, and computes the facial shape model conformity (S311).

The facial shape model conformity determination means 113 determines (discriminates) whether the facial shape model conformity is larger than a predetermined threshold (S313). When the suitability is smaller than the threshold (S313: No), the data processing device 100 executes the processes of S303 to S311 again to thereby compute the facial shape model conformity using another facial feature point classifier and another facial shape model.

(3. Specific Example of Process)

Hereinafter, a specific example of the operation of the facial feature point detection device 10 according to the present embodiment will be described with reference to FIGS. 3 to 6.

Figure 3:
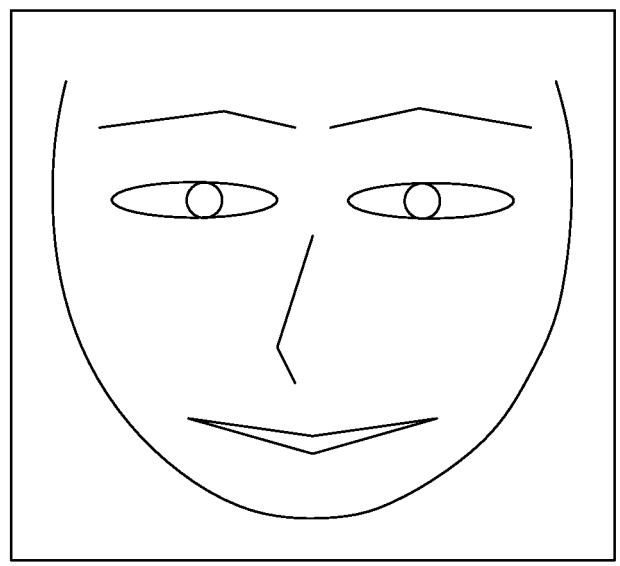
FIG. 3 is a diagram illustrating a specific example of a facial image.

As described above, the facial image input means 101 receives a facial image captured by a digital camera, for example. FIG. 3 is a diagram illustrating a specific example of the facial image input by the facial image input means 101. Here, the facial image input by the facial image input means 101 may include the background in addition to the face. Further, face detection may be performed in advance to obtain, as a facial image, an image of only a region in which the face is imaged, which is cut from an image in which the face is imaged.

The facial feature point classifier selection means 103 selects a specific classifier among the facial feature point classifiers stored in the facial feature point classifier storage means 201. The facial feature point classifier storage means 201 can store various types of facial feature point classifiers for each facial feature point. Specific examples of an eye classifier of the facial feature point classifier include an eye classifier for front faces, an eye classifier for side faces, an eye classifier for smiling frontal faces, and an eye classifier for frontal faces wearing eye-glasses. Moreover, specific examples of a mouth classifier include a mouth classifier for frontal faces, a mouth classifier for side faces, a mouth classifier for smiling frontal faces, and a mouth classifier for frontal faces with beard. As a method of allowing the facial feature point classifier selection means 103 to select a specific classifier among a plurality of classifiers, a method of sequentially selecting stored classifiers one by one, a method of performing face direction estimation and face expression estimation in advance and then selecting a classifier according to the estimation result, and the like can be used, for example.

Figure 4:
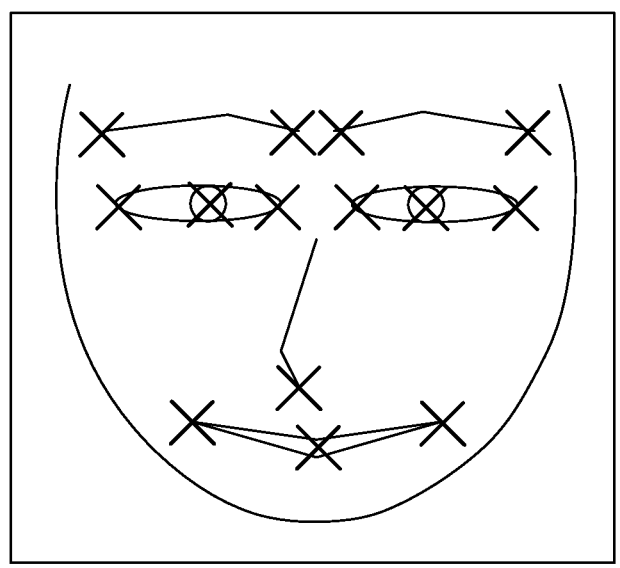
FIG. 4 is a diagram illustrating a specific example of facial feature points that are to be detected in a facial image.

The facial feature point reliability generation means 105 generates a reliability image indicating the suitability of the facial feature point of the eyes, the nose, or the like for each facial feature point from the facial image input by the facial image input means 101 using the classifier selected by the facial feature point classifier selection means 103. FIG. 4 is a diagram illustrating a specific example of the facial feature points that are to be detected in the facial image of FIG. 3. In FIG. 4, the facial feature points that are to be detected are indicated by "X" marks. In the example of FIG. 4, fourteen points in total located at both ends of left and right eyebrows, the center and both ends of left and right eyes, the bottom of the nose, both ends and the center of the mouth are used as detection target facial feature points (see "X" marks in the figure). The facial feature point reliability generation means 105 generates a reliability image corresponding to each point. That is, the facial feature point reliability generation means 105 generates fourteen reliability images in total.

Here, various method proposed conventionally can be used as a method of computing the reliability indicating the suitability of the facial feature point. For example, the reliability images may be generated by applying a classifier for each facial feature point, constructed by employing the AdaBoost based on the Haar-like features proposed by Viola and Jones, to the entire region of the image input by the facial image input means 101.

Figure 5:
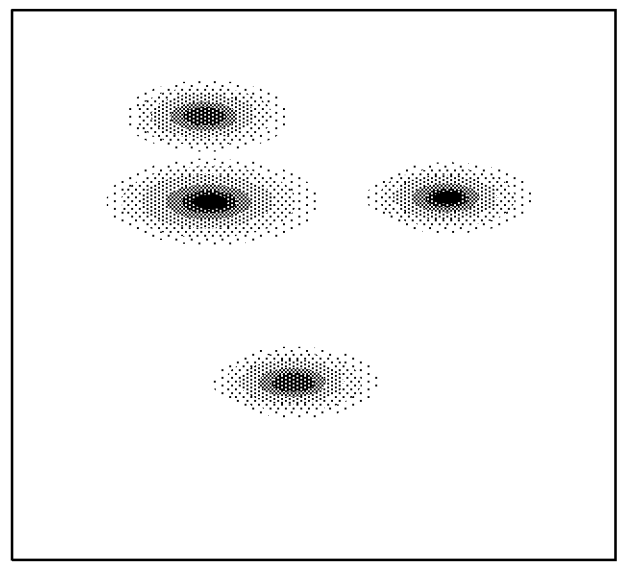
FIG. 5 is a diagram illustrating a specific example of a reliability image of a pupil center of the right eye.

FIG. 5 is a diagram illustrating a specific example of a reliability image of the pupil center of the right eye. In the example of FIG. 5, the higher the reliability indicating the suitability of the facial feature point, the darker is the point. The reliability is high not only at the pupil center of the right eye but also at the positions near the pupil center of the left eye, the right eyebrow, and the bottom of the nose.

The facial feature point candidate position computation means 107 calculates (computes) the position (candidate position) of the candidate for the facial feature point based on the reliability image generated by the facial feature point reliability generation means 105. When detecting the positions of the fourteen facial feature points illustrated in FIG. 5, a plurality of candidate positions is computed for each of the fourteen facial feature points. The facial feature point candidate position computation means 107 uses the position in which the reliability is the largest (a position having relatively high reliability as compared to the neighboring region when seen in a local region) and is equal to or larger than a predetermined threshold in each reliability image generated by the facial feature point reliability generation means 105 as the candidate position of the facial feature point. Moreover, the facial feature point candidate position computation means 107 may use a position in which the product of a prior distribution of facial feature point positions and the facial feature point reliability is equal to or larger than a predetermined threshold as the candidate position of the facial feature point rather than using the position in the reliability image in which the reliability is the largest and is equal to or larger than a predetermined threshold.

Figure 6:
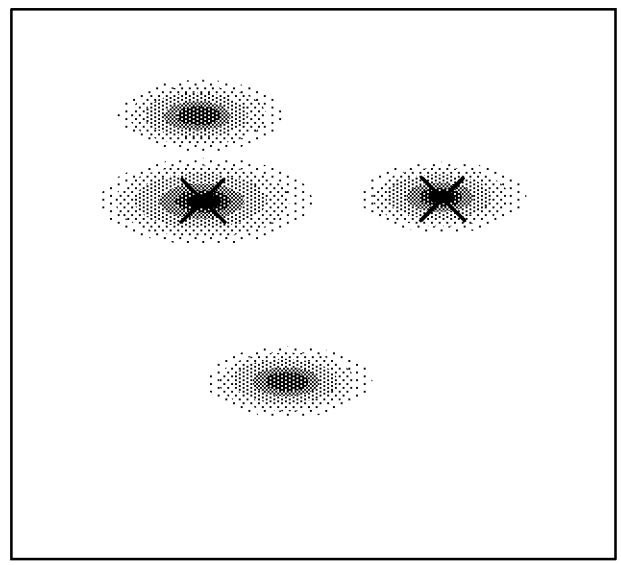
FIG. 6 is a diagram for describing a specific example of selecting a candidate position of a facial feature point in the reliability image illustrated in FIG. 5.

FIG. 6 is a diagram illustrating a specific example of detecting the candidate position of the facial feature point for a reliability image near the pupil center of the right eye illustrated in FIG. 5. In FIG. 6, the positions in which the reliability is the largest and is equal to or larger than a threshold (that is, the candidate positions of the facial feature point) are indicated by "X" marks. In the specific example of FIG. 6, as it was explained with reference to FIG. 5, the reliability is high not only at the pupil center of the right eye but also at the positions near the pupil center of the left eye, the right eyebrow, and the bottom of the nose. However, since the reliability at the positions of the pupil centers of the left and right eyes is the largest and is equal to or larger than the threshold, the positions (see "X" marks in FIG. 6) of the pupil centers of the left and right eyes are selected as the candidate positions of the facial feature point for the pupil center of the right eye.

The facial shape model selection means 109 selects a specific facial shape model among the facial shape models stored in the facial shape model storage means 203. The facial shape model storage means 203 can store various types of facial shape models such as, for example, a facial shape model for frontal faces, a facial shape model of side faces, a facial shape model for smiling frontal faces, a facial shape model for frontal faces wearing eye-glasses, and a facial shape model for frontal faces with beard. As a method of allowing the facial shape model selection means 109 to select a specific facial shape model among the various facial shape models, a method of sequentially selecting stored facial shape models one by one, a method of performing face direction estimation and face expression estimation in advance and then selecting a facial shape model according to the estimation result, and the like can be used, for example. Alternatively, the facial shape model selection means 109 may select a facial shape model corresponding to the classifier selected by the facial feature point classifier selection means 103 such that, if the facial feature point classifier selected by the facial feature point classifier selection means 103 is a classifier for smiling frontal faces, the facial shape model selection means 109 selects a facial shape model for smiling frontal faces.

The facial shape model conformity computation means 111 determines a facial feature point that satisfies the conditions based on the candidate positions of the facial feature points and the positions of the points corresponding to the feature points of the facial shape model selected by the facial shape model selection means 109 among a plurality of candidates for the facial feature points computed by the facial feature point candidate position computation means 107 and computes a facial shape model conformity. The facial feature point that satisfies the conditions can be determined in the following manner, for example.

First, the facial shape model conformity computation means 111 obtains parameters of coordinate transformation between the positions of the facial feature point candidates and the positions of the points corresponding to the feature points of the facial shape model according to robust estimation. Subsequently, the facial shape model conformity computation means 111 selects a candidate in which the difference between a position obtained by transforming the candidate position of each of the facial feature points into the coordinate system of the facial shape model based on the coordinate transformation parameters obtained by the robust estimation and the position of the facial shape model is the smallest. Various robust estimation methods have been proposed conventionally, and various robust estimation methods can be used for this process.

The facial shape model conformity can be computed from the difference between the reliability of the facial feature point candidate computed by the facial feature point reliability generation means 105 and the facial shape model computed based on the robust estimation. For example, when the reliability of the facial feature point candidate selected by the facial shape model conformity computation means 111 based on the difference from the facial shape model is $S_i$ ("i" indicates the facial feature point number, and in this specific example, "i" can take any one of the values 1 to 14), the difference between the selected facial feature point candidate and the facial shape model is $E_i$, and σ is a sigmoid function, the conformity J can be calculated according to the following equation.

$$J=\Sigma(S_i)+\lambda\times\Sigma(\sigma(-E_i))  \quad \text{[Mathematical Formula 1]}$$

Here, λ is a coefficient that determines which one of the reliability of the facial feature point candidate and the difference from the facial shape model will be more preferentially used as the conformity.

Moreover, the conformity J may be calculated according to the following equation in order to make the calculation robust against the influence of a feature point that greatly deviates from the facial shape model among the facial feature points.

$$J=\text{Med}(S_i)+\lambda\times\text{Med}(\sigma(-E_i))  \quad \text{[Mathematical Formula 2]}$$

Mere, Med is a function that computes a median value.

The facial shape model conformity determination means 113 determines whether the facial shape model conformity computed by the facial shape model conformity computation means 111 is higher (larger) than a predetermined threshold. When the conformity is lower (smaller) than the threshold, the processes by the facial feature point classifier selection means 103 to the facial shape model conformity computation means 111 are executed again to compute the facial shape model conformity using another facial feature point classifier and another facial shape model. When the conformity becomes higher than the threshold as the result of the process, the facial shape model conformity determination means 113 outputs the position of the facial feature point.

(4. Advantage of Present Embodiment)

As described above, the facial feature point detection device 10 according to the present embodiment can select a facial feature point classifier and a facial shape model that are ideal for a target image using the conformity computed from the facial feature point reliability and the difference from the facial shape model based on the robust estimation. Thus, it is possible to detect the positions of facial feature points with high accuracy even if the possibility of failure in facial feature point detection is high when one classifier or model is used due to a change in illumination during capturing of facial images, a change in facial expressions, shading, or the like.

(5. Notes)

The configurations of the embodiments described above may be combined or some configuration may be interchanged. Moreover, the configuration of the present invention is not limited to the embodiments described above, and various changes can be made without departing from the scope of the present invention.

Some or all of the embodiments described above may be described as the following notes, and the present invention is not limited to the following.

(Note 1)

An information processing device including: input means for receiving a facial image; reliability calculation means for generating, based on a plurality of classifiers for computing the suitability of feature points of a face, a reliability image indicating the suitability for each feature point from the facial image; candidate position calculation means for obtaining a candidate position of the feature point in the facial image based on the reliability image; and conformity calculation means for determining a feature point that satisfies conditions based on a position corresponding to each of the feature points of one facial shape model selected from a plurality of statistically generated facial shape models and the candidate position of the feature point calculated by the candidate position calculation means, and for calculating a conformity to the facial shape model.

(Note 2)

The information processing device according to Note 1, wherein position information of a feature point of which the conformity is higher than a threshold is output.

(Note 3)

The information processing device according to Note 1 or 2, wherein the conformity calculation means computes, according to a robust estimation method, a difference between the position corresponding to each of the feature points of one facial shape model selected from the plurality of statistically generated facial shape models and the candidate position of the feature point calculated by the candidate position calculation means and calculates the conformity based on the difference.

(Note 4)

An information processing method including the steps of: receiving a facial image; generating, based on a plurality of classifiers for computing the suitability of feature points of a face, a reliability image indicating the suitability for each feature point from the facial image; obtaining a candidate position of the feature point in the facial image based on the reliability image; and determining a feature point that satisfies conditions based on a position corresponding to each of the feature points of one facial shape model selected from a plurality of statistically generated facial shape models and the candidate position of the feature point, and calculating a conformity to the facial shape model.

(Note 5)

A program for causing an information processing device to execute the steps of: receiving a facial image; generating, based on a plurality of classifiers for computing the suitability of feature points of a face, a reliability image indicating the suitability for each feature point from the facial image; obtaining a candidate position of the feature point in the facial image based on the reliability image; and determining a feature point that satisfies conditions based on a position corresponding to each of the feature points of one facial shape model selected from a plurality of statistically generated facial shape models and the candidate position of the feature point, and calculating a conformity to the facial shape model.

This application claims priority to Japanese Patent Application No. 2012-72098, filed Mar. 27, 2012, the entire disclosure of which is incorporated herein by reference.

10: FACIAL FEATURE POINT DETECTION DEVICE
100: DATA PROCESSING DEVICE
101: FACIAL IMAGE INPUT MEANS
103: FACIAL FEATURE POINT CLASSIFIER SELECTION MEANS
105: FACIAL FEATURE POINT RELIABILITY GENERATION MEANS
107: FACIAL FEATURE POINT CANDIDATE POSITION COMPUTATION MEANS
109: FACIAL SHAPE MODEL SELECTION MEANS
111: FACIAL SHAPE MODEL CONFORMITY COMPUTATION MEANS
113: FACIAL SHAPE MODEL CONFORMITY DETERMINATION MEANS

I claim:

1. An information processing device comprising:
an input that receives a facial image;
a reliability calculator that generates a plurality of reliability images which show measures of suitability for each feature part of a face, wherein the suitability is computed by a plurality of classifiers;
a candidate position calculator that obtains at least one candidate position for each of the feature parts in the facial image based on the reliability images, wherein the suitability of the at least one candidate position is higher than a predetermined threshold; and
a conformity calculator that determines a feature part that satisfies conditions regarding the candidate position of the feature part and a position corresponding to each of the feature parts of one facial shape model selected from a plurality of statistically generated facial shape models,
wherein the conformity calculator calculates a conformity to the facial shape model,
a facial shape model conformity determination device that selects a facial shape model which has higher conformity than a threshold among the plurality of facial shape models and outputs the position of each feature part which is determined based on the selected facial shape model, and
wherein the conformity is calculated according to:

$$J=\Sigma(S_i)+\lambda\times\Sigma(\sigma(-E_i))$$

where J is the conformity, $S_i$ is the facial shape model, i indicates the facial feature point number, $E_i$ is the difference between the selected facial feature point candidate and the facial shape model, $\sigma$ is a sigmoid function and $\lambda$ is a coefficient that determines which one of the reliability of the facial feature point candidate and the difference from the facial shape model will be more preferentially used as the conformity facial shape model.

2. An information processing device comprising:
an input that receives a facial image;
a reliability calculator that generates a plurality of reliability images which show measures of suitability for each feature part of a face, wherein the suitability is computed by a plurality of classifiers;
a candidate position calculator that obtains at least one candidate position for each of the feature parts in the facial image based on the reliability images, wherein the suitability of the at least one candidate position is higher than a predetermined threshold; and
a conformity calculator that determines a feature part that satisfies conditions regarding the candidate position of the feature part and a position corresponding to each of the feature parts of one facial shape model selected from a plurality of statistically generated facial shape models,
wherein the conformity calculator calculates a conformity to the facial shape model,
a facial shape model conformity determination device that selects a facial shape model which has higher conformity than a threshold among the plurality of facial shape models and outputs the position of each feature part which is determined based on the selected facial shape model, and
wherein the conformity is calculated according to:

$$J=\text{Med}(S_i)+\lambda\times\text{Med}(\sigma(-E_i))$$

where J is the conformity, $S_i$ is the facial shape model, i indicates the facial feature point number, $E_i$ is the difference between the selected facial feature point candidate and the facial shape model, $\sigma$ is a sigmoid function, $\lambda$ is a coefficient that determines which one of the reliability of the facial feature point candidate and the difference from the facial shape model will be more preferentially used as the conformity facial shape model and Med is a function that computes a median value.

3. An information processing method comprising the steps of:
receiving a facial image;
generating a plurality of reliability images which show measures of suitability for each feature part of a face, wherein the suitability is computed by a plurality of classifiers;
obtaining at least one candidate position for each of the feature parts in the facial image based on the reliability images, wherein the suitability of the at least one candidate position is higher than a predetermined threshold;
determining a feature part that satisfies conditions regarding the candidate position of the feature part and a position corresponding to each of the feature parts of one facial shape model selected from a plurality of statistically generated facial shape models; and
calculating a conformity to the facial shape model,
wherein a facial shape model conformity is determined by selecting a facial shape model which has higher conformity than a threshold among the plurality of facial shape models and outputs the position of each feature part which is determined based on the selected facial shape model, and wherein the conformity is calculated according to:

$$J=\Sigma(S_i)+\lambda\times\Sigma(\sigma(-E_i))$$

where J is the conformity, $S_i$ is the facial shape model, i indicates the facial feature point number, $E_i$ is the difference between the selected facial feature point candidate and the facial shape model, σ is a sigmoid function and λ is a coefficient that determines which one of the reliability of the facial feature point candidate and the difference from the facial shape model will be more preferentially used as the conformity facial shape model.

4. An information processing method comprising the steps of:
receiving a facial image;
generating a plurality of reliability images which show measures of suitability for each feature part of a face, wherein the suitability is computed by a plurality of classifiers;
obtaining at least one candidate position for each of the feature parts in the facial image based on the reliability images, wherein the suitability of the at least one candidate position is higher than a predetermined threshold;
determining a feature part that satisfies conditions regarding the candidate position of the feature part and a position corresponding to each of the feature parts of one facial shape model selected from a plurality of statistically generated facial shape models; and
calculating a conformity to the facial shape model,
wherein a facial shape model conformity is determined by selecting a facial shape model which has higher conformity than a threshold among the plurality of facial shape models and outputs the position of each feature part which is determined based on the selected facial shape model, and
wherein the conformity is calculated according to:

$$J=\text{Med}(S_i)+\lambda\times\text{Med}(\sigma(-E_i))$$

where J is the conformity, $S_i$ is the facial shape model, i indicates the facial feature point number, $E_i$ is the difference between the selected facial feature point candidate and the facial shape model, σ is a sigmoid function, λ is a coefficient that determines which one of the reliability of the facial feature point candidate and the difference from the facial shape model will be more preferentially used as the conformity facial shape model and Med is a function that computes a median value.

5. A non-transitory, information processing device-readable storage medium storing a program for causing an information processing device to execute the steps of:
receiving a facial image;
generating a plurality of reliability images which show measures of suitability for each feature part of a face, wherein the suitability is computed by a plurality of classifiers;
obtaining at least one candidate position for each of the feature parts in the facial image based on the reliability images, wherein the suitability of the at least one candidate position is higher than a predetermined threshold;
determining a feature part that satisfies conditions regarding the candidate position of the feature part and a position corresponding to each of the feature parts of one facial shape model selected from a plurality of statistically generated facial shape models; and
calculating a conformity to the facial shape model,
wherein a facial shape model conformity is determined by selecting a facial shape model which has higher conformity than a threshold among the plurality of facial shape models and outputs the position of each feature part which is determined based on the selected facial shape model, and
wherein the conformity is calculated according to:

$$J=\Sigma(S_i)+\lambda\times\Sigma(\sigma(-E_i))$$

where J is the conformity, $S_i$ is the facial shape model, i indicates the facial feature point number, $E_i$ is the difference between the selected facial feature point candidate and the facial shape model, σ is a sigmoid function and λ is a coefficient that determines which one of the reliability of the facial feature point candidate and the difference from the facial shape model will be more preferentially used as the conformity facial shape model.

6. A non-transitory, information processing device-readable storage medium storing a program for causing an information processing device to execute the steps of:
receiving a facial image;
generating a plurality of reliability images which show measures of suitability for each feature part of a face, wherein the suitability is computed by a plurality of classifiers;
obtaining at least one candidate position for each of the feature parts in the facial image based on the reliability images, wherein the suitability of the at least one candidate position is higher than a predetermined threshold;
determining a feature part that satisfies conditions regarding the candidate position of the feature part and a position corresponding to each of the feature parts of one facial shape model selected from a plurality of statistically generated facial shape models; and
calculating a conformity to the facial shape model,
wherein a facial shape model conformity is determined by selecting a facial shape model which has higher conformity than a threshold among the plurality of facial shape models and outputs the position of each feature part which is determined based on the selected facial shape model, and
wherein the conformity is calculated according to:

$$J=\text{Med}(S_i)+\lambda\times\text{Med}(\sigma(-E_i))$$

where J is the conformity, $S_i$ is the facial shape model, indicates the facial feature point number, $E_i$ is the difference between the selected facial feature point candidate and the facial shape model, σ is a sigmoid function, λ is a coefficient that determines which one of the reliability of the facial feature point candidate and the difference from the facial shape model will be more preferentially used as the conformity facial shape model and Med is a function that computes a median value.

* * * * *